Figure 1:
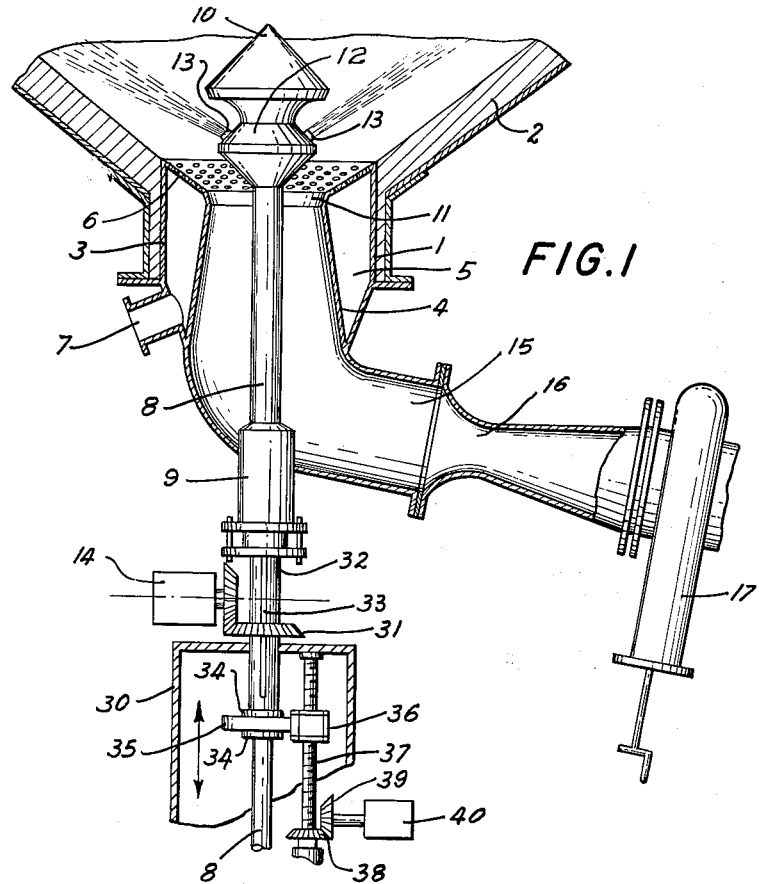

May 15, 1956   E. H. KNOPF   2,745,743
CELLULOSE COOKERS
Filed July 12, 1954

INVENTOR.
Erich H. Knopf
BY
Michael S. Striker
Agent

United States Patent Office

2,745,743
Patented May 15, 1956

2,745,743

CELLULOSE COOKERS

Erich H. Knopf, Raubling, Upper Bavaria, Germany, assignor to Aschaffenburger Zellstoffwerke A. G., Redenfelden, Upper Bavaria, Germany Application July 12, 1954, Serial No. 442,846

Claims priority, application Germany July 13, 1953

12 Claims. (Cl. 92—7)

The present invention relates to apparatus for treating cellulose and in particular to cellulose cookers.

With known cellulose cookers it is difficult to produce the desired reactions because the treated material cannot be removed from the interior of the cooker at any desired rate. It is known, for example, to provide air blasting devices and the like for guaranteeing that the charge of a cellulose cooker will be removed therefrom, but such devices greatly reduce the time during which the material is removed from the cooker and limit the charge which may be placed in the cooker. Furthermore, because of the speed with which it has been found necessary to empty a cellulose cooker, it is very difficult to recover from the material flowing from the cooker the heat stored therein or such components thereof as sulphur and the like.

One of the objects of the present invention is to overcome the above drawbacks by providing a means for removing the material from a cellulose cooker in a relatively slow continuous completely adjustable manner so that expedients such as the above-mentioned air blasting devices need not be resorted to and so that relatively small economical devices may be employed for recovering from the material of the cooker heat, sulphur, etc.

Furthermore, it is an object of the present invention to provide a means for supplying a charge to a cooker in a continuous manner as well as for removing the material from the cooker in a continuous manner.

It is also an object of the present invention to provide a means for supplying liquid to or removing liquid from the interior of the cooker simultaneously with the operation thereof.

An additional object of the present invention is to provide a means for spraying liquid into the interior of the cooker in such a way that the material in the cooker is incapable of forming large masses which will block the flow of material from the cooker.

With the above objects in view the present invention mainly consists of a cellulose cooker which includes a container in which raw cellulose is treated, this container being formed with upper and lower openings respectively in top and bottom portions of the container. A supply means communicates with the upper opening for supplying raw cellulose and additional chemicals to the interior of the container, and a conduit means communicates with the lower opening for leading treated material away from the container. A control means forms part of the conduit means for controlling the flow of material from the container, and a means is located adjacent the lower opening for directing streams of liquid upwardly into the interior of the container. This last means turns so that the streams of liquid rotate, and these streams of liquid are inclined to different extents so that these streams pass through different parts of the material in the container to prevent the formation of large masses of material which would stop up the conduit means.

Figure 2:
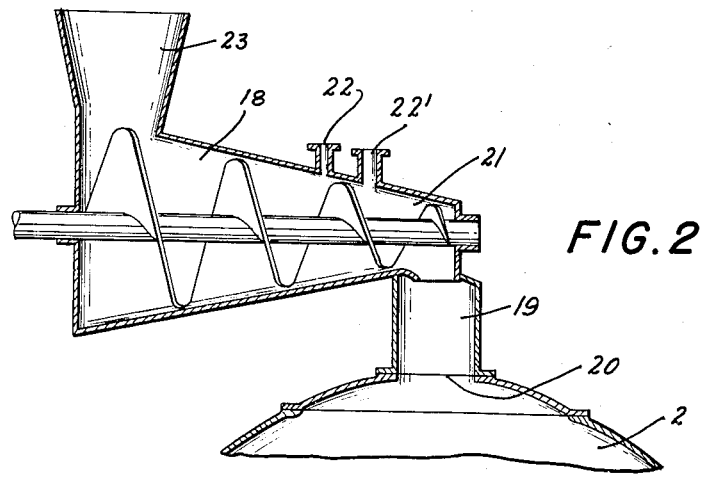

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a fragmentary sectional partly diagrammatic view of the bottom portion of a cellulose cooker constructed in accordance with the present invention; and Fig. 2 is a fragmentary sectional diagrammatic view of a top portion of a cellulose cooker constructed in accordance with the present invention.

Referring now to the drawings, it will be seen from Fig. 1 that the cooker includes a container 2 formed in a bottom portion thereof with a lower opening 1 which is preferably located centrally with respect to the container 2. A tubular insert 3 is mounted in the opening 1 and an outlet conduit 4 is fixed to the bottom periphery of insert 3 and extends outwardly beyond the latter as well as into the interior of the insert 3. The top end of conduit 4 is interconnected with the top end of insert 3 by an annular perforated wall portion 6, so that the parts 3, 4 and 6 form an annular wall means which define an annular chamber 5 located for the most part within the opening 1, as shown in Fig. 1. A duct 7 communicates with the interior of chamber 5 so that liquid may be supplied into or removed from the container 2 through perforated wall portion 6, chamber 5 and duct 7.

The outlet conduit means 4 serves to mount a means for directing streams of liquid upwardly into the interior of the container as well as for opening and closing the latter. This means takes the form of a hollow shaft 8 extending slidably through a stuffing box 9 so that the place where the shaft 8 extends through the wall of conduit 4 is sealed. The top end of hollow shaft 8 carries a valve member 10 which cooperates with a valve seat 11 located at the top end of conduit 4 for closing the container when valve member 10 is in engagement with the valve seat 11 and for opening the outlet to conduit 4 when the parts are in the position shown in Fig. 1. Beneath the valve member 10 the shaft 8 carries an annular housing 12 which defines an inner space communicating with the interior of hollow shaft 8, and the annular housing 12 has a top wall which carries a plurality of nozzles 13 whose axes are respectively inclined to different extents. Thus, a liquid such as an acid may be guided upwardly through the shaft 8 to the interior of housing 12 and from the latter through the nozzles 13 upwardly into the interior of container 2. The shaft 8 is supplied with liquid by a container shown fragmentarily at the bottom of Fig. 1 and carrying the shaft 8, this container also carrying the motor 14 which is interconnected through suitable bevel gears to the shaft 8 so as to rotate the latter. In this way the streams issuing from the nozzles 13 rotate so as to efficiently prevent formation of any undesirably large masses in the interior of the container 2. The container which supplies shaft 8 with liquid is moved up and down either by hand or through any suitable mechanism (not shown) for opening and closing the container 2, and any suitable pump or the like may be provided to feed liquid with the desired pressure upwardly along shaft 8 to the nozzles 13.

The outlet conduit 4 forms part of a conduit means 15 which also includes as part thereof a nozzle 16 which is removably connected into the conduit means 15. Thus, any group of nozzles 16 of different sizes may be provided to be interchangeably located in the conduit means 15 for controlling the flow of material away from the container 2. A gate valve 17 may be provided either before or after the nozzle 16.

The structure for supplying material to the interior of the container is illustrated in Fig. 2 from which it may be seen that the container 2 is formed in its top portion with an upper opening 20 which communicates through a tube 19 with the smaller outlet end of a conical housing 18 which has rotatably mounted therein a conical worm screw for compressing and feeding material supplied through inlet 23 to the outlet region 21 of housing 18 and from the latter through tube 19 and opening 20 into the interior of the container 2. One or more ducts 22, 22' communicate with the interior of housing 18 at an intermediate portion thereof for supplying steam, chemicals or the like into the interior of the housing 18. Although a single one-step feeding arrangement is shown in Fig. 2, it should be understood that several of the material-supplying structures of Fig. 2 may be provided to provide a multiple-step feeding system. The opening 23 of housing 18 is supplied with a premixed charge of chippings or other comminuted plant or chemical raw material containing cellulose, and this material is further mixed by the worm screw and compressed by the conicity of the housing so that the material itself forms a plug which seals the interior of the container 2. In order to support the seal steam at a proper pressure is supplied to the interior of the housing 18.

One possible structure for raising and lowering hollow shaft 8 while maintaining the same rotatable is shown in Fig. 1. Thus, the hollow pedestal 30 supports the motor 14, and the bevel gear 31 is also rotatably supported on the top wall of pedestal 30. Hollow shaft 8 is connected at its bottom end to a flexible hose or the like which supplies fluid to the same. A sleeve 32 is fixed to the shaft 8 which extends through the sleeve 32, and the latter is formed with an axial slot 33 into which a pin fixed to bevel gear 31 freely extends so that shaft 8 and sleeve 32 are constrained to rotate with gear 31 but are axially movable with respect to the same. The sleeve 32 has a pair of collars 34 fixed to its outer surface, and the sleeve 32 extends through an opening in arm 35 which is located between and engages the collars 34 so that sleeve 32 is rotatable about its axis with respect to arm 35 but on the other hand is constrained to move along its axis when arm 35 is vertically shifted, as viewed in Fig. 1. The arm 35 is fixed to a nut 36 in threaded engagement with a screw 37 rotatably supported within pedestal 30 and having bevel gear 38 fixed to its bottom end. Gear 38 meshes with gear 39 which is driven by motor 40, the shaft of which extends through an opening in pedestal 30. Motor 40 is reversible, so that depending on the direction of rotation of motor 40 the nut 36 and arm 35 will be raised and lowered to raise and lower the sleeve 32 and shaft 8 therewith so as to close or open the opening 11.

With the above described structure of the invention, the cellulose cooker may be operated slowly and continuously in a simple manner and without difficulties and it may be uniformly charged and discharged without encountering any disturbances such as undesirable stoppages during the charging and discharging of the material from the cooker. Furthermore, it is possible to employ relatively small and economical devices for recovering heat and sulphur from the process. The product obtained from the construction of the invention is of the same high quality as the product which has been produced up to the present time only by discontinuous processes.

It will be understood that each of the elements described above, or two or more together, may also find a useful application in other types of cookers differing from the types described above.

While the invention has been illustrated and described as embodied in cellulose cookers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A cellulose cooker comprising, in combination, a container in which raw cellulose is treated, said container being formed with upper and lower openings respectively in top and bottom portions thereof; supply means communicating with said upper opening for supplying raw cellulose and additional chemicals to the interior of said container; conduit means communicating with said lower opening for leading treated material away from said container; control means forming part of said conduit means for controlling the flow of material from said container; and means located adjacent said lower opening of said container and communicating permanently with the interior thereof for directing streams of treating liquid into and out of the interior of said container.

2. A cellulose cooker comprising, in combination, a container in which raw cellulose is treated, said container being formed with upper and lower openings respectively in top and bottom portions thereof; supply means communicating with said upper opening for supplying raw cellulose and additional chemicals to the interior of said container; conduit means communicating with said lower opening for leading treated material away from said container; and means located adjacent said lower opening of said container and communicating permanently with the interior thereof for directing streams of treating liquid into and out of the interior of said container.

3. A cellulose cooker comprising, in combination, a container in which raw cellulose is treated, said container being formed with upper and lower openings respectively in top and bottom portions thereof; supply means communicating with said upper opening for supplying raw cellulose and additional chemicals to the interior of said container; conduit means communicating with said lower opening for leading treated material away from said container; means located adjacent said lower opening of said container and communicating permanently with the interior thereof for directing streams of treating liquid into and out of the interior of said container; and means turnably carried by said conduit means adjacent said lower opening of said container for directing rotating streams of treating liquid upwardly into the interior of said container.

4. A cellulose cooker comprising, in combination, a container in which raw cellulose is treated, said container being formed with upper and lower openings respectively in top and bottom portions thereof; supply means communicating with said upper opening for supplying raw cellulose and additional chemicals to the interior of said container; conduit means communicating with said lower opening for leading treated material away from said container; control means forming part of said conduit means for controlling the flow of material from said container; means located adjacent said lower opening of said container and communicating permanently with the interior thereof for directing streams of treating liquid into and out of the interior of said container; and means turnably carried by said conduit means adjacent said lower opening of said container for directing rotating streams of treating liquid upwardly into the interior of said container.

5. A cellulose cooker comprising, in combination, a container in which raw cellulose is treated, said container being formed with upper and lower openings respectively in top and bottom portions thereof; supply means communicating with said upper opening for supplying raw cellulose and additional chemicals to the interior of said container; conduit means communicating with said lower opening for leading treated material away from said container; a nozzle forming part of said conduit means for controlling the flow of material from said container; and means located adjacent said lower opening of said container and communicating permanently with the interior thereof for directing streams of treating liquid into and out of the interior of said container.

6. A cellulose cooker comprising, in combination, a container in which raw cellulose is treated, said container being formed with upper and lower openings respectively in top and bottom portions thereof; supply means communicating with said upper opening for supplying raw cellulose and additional chemicals to the interior of said container; conduit means communicating with said lower opening for leading treated material away from said container; valve means forming part of said conduit means for controlling the flow of material from said container; and means located adjacent said lower opening of said container and communicating permanently with the interior thereof for directing streams of treating liquid into and out of the interior of said container.

7. A cellulose cooker comprising, in combination, a container in which raw cellulose is treated, said container being formed with upper and lower openings respectively in top and bottom portions thereof; supply means communicating with said upper opening for supplying raw cellulose and additional chemicals to the interior of said container; conduit means communicating with said lower opening for leading treated material away from said container; means located adjacent said lower opening of said container and communicating permanently with the interior thereof for directing streams of treating liquid into and out of the interior of said container; and means turnably carried by said conduit means adjacent said lower opening of said container for directing rotating streams of treating liquid upwardly into the interior of said container respectively along paths which are inclined to different extents.

8. A cellulose cooker comprising, in combination, a container in which raw cellulose is treated, said container being formed with upper and lower openings respectively in top and bottom portions thereof; supply means communicating with said upper opening for supplying raw cellulose and additional chemicals to the interior of said container; conduit means communicating with said lower opening for leading treated material away from said container; means located adjacent said lower opening of said container and communicating permanently with the interior thereof for directing streams of treating liquid into and out of the interior of said container, said latter means including an annular chamber being located at the bottom of said container and also having a perforated wall forming part of the bottom portion of said container; a hollow shaft extending through said conduit means and said lower opening of said container and being mounted on said conduit means for inward and outward movement with respect to said container; a valve member located on the top end of said shaft for closing said lower opening of said container when said shaft moves outwardly with respect to the container and for opening said lower opening of said container when said shaft moves upwardly and inwardly with respect to said container; an annular housing mounted on said shaft beneath said valve member and defining an inner space communicating with the interior of said valve, said housing having a top wall directed toward the interior of said container; and a plurality of nozzles mounted on and distributed about said top wall of said housing for directing into the interior of said container streams of liquid supplied to the interior of said shaft and moving upwardly therealong into said annular housing.

9. A cellulose cooker comprising, in combination, a container in which raw cellulose is treated, said container being formed with upper and lower openings respectively in top and bottom portions thereof; supply means communicating with said upper opening for supplying raw cellulose and additional chemicals to the interior of said container; means located adjacent said lower opening of said container and communicating permanently with the interior thereof for directing streams of treating liquid into and out of the interior of said container, said latter means including an annular chamber being located at the bottom of said container and also having a perforated wall forming part of the bottom portion of said container; conduit means communicating with said lower opening for leading treated material away from said container; a hollow shaft extending through said conduit means and said lower opening of said container and being mounted on said conduit means for inward and outward movement with respect to said container; a valve member located on the top end of said shaft for closing said lower opening of said container when said shaft moves outwardly with respect to the container and for opening said lower opening of said container when said shaft moves upwardly and inwardly with respect to said container; an annular housing mounted on said shaft beneath said valve member and defining an inner space communicating with the interior of said valve, said housing having a top wall directed toward the interior of said container; a plurality of nozzles mounted on and distributed about said top wall of said housing for directing into the interior of said container streams of liquid supplied to the interior of said shaft and moving upwardly therealong into said annular housing; and turning means operatively connected to said shaft for rotating the latter about its axis so that the streams of liquid issuing from said nozzles rotate during rotation of said shaft.

10. A cellulose cooker comprising, in combination, a container in which raw cellulose is treated, said container being formed with upper and lower openings respectively in top and bottom portions thereof; supply means communicating with said upper opening for supplying raw cellulose and additional chemicals to the interior of said container; conduit means communicating with said lower opening for leading treated material away from said container; a nozzle forming part of and removably connected to said conduit means for controlling the flow of material from said container, so that a nozzle of predetermined size may be connected into said conduit means; and means located adjacent said lower opening of said container and communicating permanently with the interior thereof for directing streams of treating liquid into and out of the interior of said container said latter means including an annular chamber being located at the bottom of said container and also having a perforated container.

11. A cellulose cooker comprising, in combination, a container in which raw cellulose is treated, said container being formed with upper and lower openings respectively in top and bottom portions thereof; supply means communicating with said upper opening for supplying raw cellulose and additional chemicals to the interior of said container; conduit means communicating with said lower opening for leading treated material away from said container, said conduit means including annular wall means located in said lower opening and defining an annular chamber therein, said annular wall means having a top perforated wall portion so that liquid may flow between said chamber and the interior of said container through said perforated wall portion; a duct communicating with the interior of said annular wall means for leading liquid into or out of said chamber; and means located adjacent said lower opening for directing streams of treating liquid into the interior of said container.

12. A cellulose cooker comprising, in combination, a container in which raw cellulose is treated, said container being formed with upper and lower openings respectively in top and bottom portions thereof; supply means communicating with said upper opening for supplying raw cellulose and additional chemicals to the interior of said container; conduit means communicating with said lower opening for leading treated material away from said container, said conduit means including annular wall means located in said lower opening and defining an annular chamber therein, said annular wall means having a top perforated annular wall portion so that liquid may flow between said chamber and the interior of said container through said perforated wall portion; a duct communicating with the interior of said annular wall means for leading liquid into or out of said chamber; means located adjacent said lower opening for directing streams of treating liquid into the interior of said container; and a valve member carried by said conduit means for movement from a position engaging the inner periphery of said top portion of said annular wall means, where said lower opening of said container is closed, upwardly to a position above said annular wall means for opening said lower opening of said container.

References Cited in the file of this patent

UNITED STATES PATENTS

| | | |
|---|---|---|
| 691,975 | Schaaf | Jan. 28, 1902 |
| 832,935 | Van Voorhis | Oct. 9, 1906 |
| 1,776,761 | Morterud | Sept. 23, 1930 |
| 1,982,130 | Wollenberg | Nov. 27, 1934 |
| 2,342,225 | Schnyder | Feb. 22, 1944 |

FOREIGN PATENTS

| | | |
|---|---|---|
| 217,130 | Great Britain | 1924 |
| 66,332 | Sweden | 1928 |